June 27, 1950 S. C. WINBOURNE 2,513,223
STALK CUTTER
Filed Nov. 20, 1947 2 Sheets-Sheet 2

Inventor
Stephen C. Winbourne

By Clarence A. O'Brien
and Harvey B. Jacobson
Attorneys

Patented June 27, 1950

2,513,223

UNITED STATES PATENT OFFICE 2,513,223

STALK CUTTER

Stephen C. Winbourne, Spring Hope, N. C.

Application November 20, 1947, Serial No. 787,169

1 Claim. (Cl. 55—61)

The present invention relates to new and useful improvements in stalk cutters or choppers and more particularly to a high speed power operated cutter for use with farm tractors.

An important object of the invention is to provide a vertically adjustable supporting frame for a rotary cutting reel and connecting the frame to a conventional hydraulic lift of a tractor whereby the cutter may be raised out of cutting position to enable travel of the tractor to and from a field without necessitating removal of the cutter therefrom.

Another object is to provide a hitch at the rear of the cutter frame for attaching a disc harrow or other agricultural implement thereto to be drawn behind the cutter.

A further object is to provide a stalk cutter which may be easily and quickly attached in operative position to a tractor without necessitating any changes or alterations in the construction thereof and which, at the same time, is simple and practical in construction, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
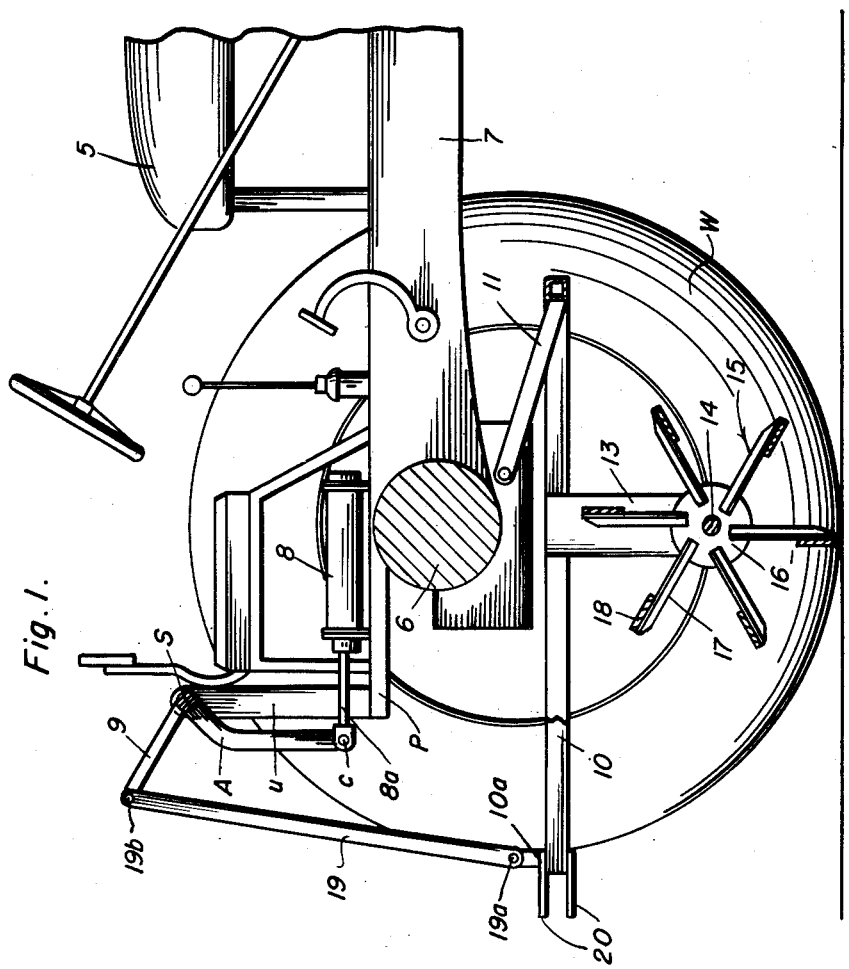
Figure 1 is a fragmentary longitudinal sectional view of a tractor showing the stalk cutter supported thereon.
Figure 2:
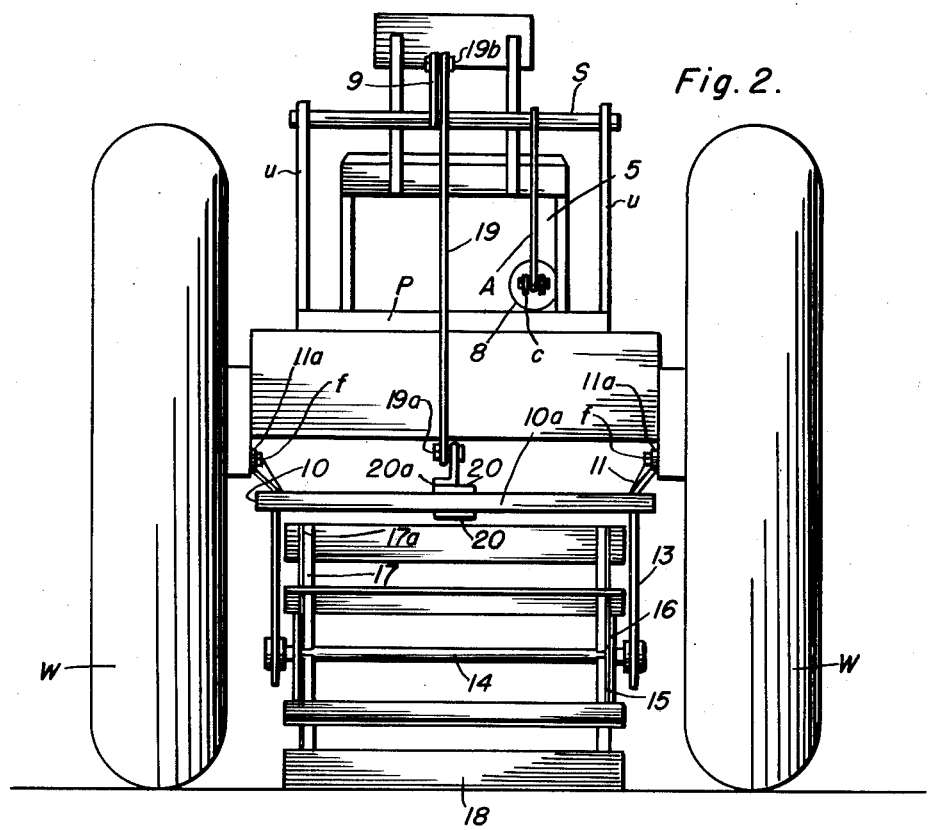
Figure 2 is a rear elevational view.
Figure 3:
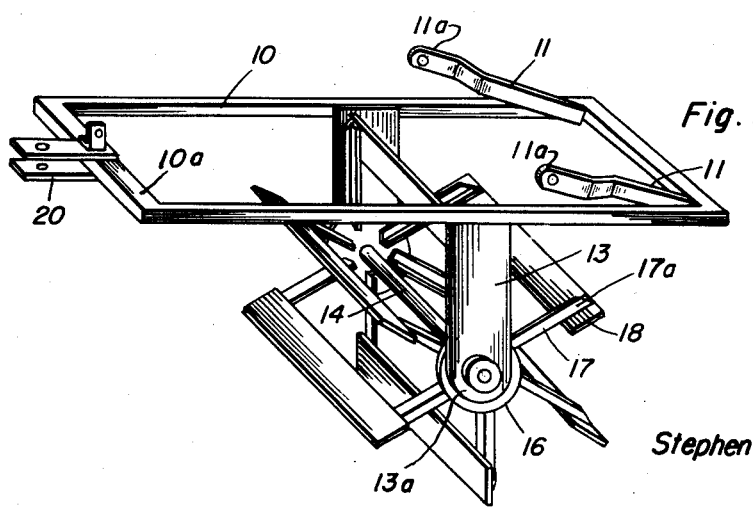
Figure 3 is a perspective view of the rotary cutting reel and supporting frame therefor.

Referring now to the drawings in detail, wherein for the purpose of illustration I have disclosed a preferred embodiment of my invention, the numeral 5 designates a conventional farm tractor which includes a rear axle housing 6, a frame 7 and a hydraulic lift mechanism 8 including a horizontally sliding piston rod 8a. The seat platform P of the tractor supports a pair of uprights U on which there is journaled for rotation a horizontally disposed transverse rock shaft S. An arm A secured to and depending from the rock shaft S is pivoted, as at c to the piston rod 8a. An upwardly inclined lift arm 9 is suitably secured to the rock shaft S for rotation with the rock shaft S.

The stalk cutter comprises a horizontal frame 10 of rectangular shape having a pair of upwardly inclined draw bar arms 11 extending rearwardly from the front of the frame 10 and which are pivotally attached by fasteners f at their upper rear ends 11a to outer end portions of the axle housing 6 to support the frame 10 under the axle housing and between the rear wheels of the tractor.

A pair of perpendicular supports 13 extend downwardly from the sides of frame 10 and in the lower ends 13a of which a stationary transverse shaft 14 is supported. A cutting reel 15 includes hubs 16 journaled on the shaft and from which arms 17 extend radially with cutting blades 18 secured to the outer ends 17a of the arms.

A vertical link 19 is pivoted as at 19a to the rear end 10a of the frame 10 and is also pivoted, as at 19b, to the lift arm 9.

A pair of vertically spaced apart rearwardly extending hitch plates 20 are secured by welding 20a, or the like to the rear end 10a of frame 10 and to which a farm implement may be attached to be drawn behind the cutter.

In the operation of the device, the tractor 5 is driven over a field with the wheels W thereof straddling a row of stalks and the reel 15 is rotated as the blades 18 thereof strike the stalks to thus cut or chop the stalks close to the ground. When moving to or from a field the hydraulic lift 8 is operated to raise the rear end of the frame 10 which pivots at its front end by means of the arms 11 to raise the reel sufficiently to clear the ground.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A stalk cutting attachment for tractors comprising a substantially rectangular horizontal frame, arms fixed to the front portion of the frame and extending upwardly and rearwardly therefrom, said arms being pivoted at their upper ends to a tractor to support the frame beneath the tractor, means connecting the rear end of the frame to the tractor for vertical adjustment of the frame, a pair of supports extending downwardly from the sides of the frame, and a cutting reel journaled at the lower ends of said supports.

STEPHEN C. WINBOURNE.

REFERENCES CITED

The following references are of record in the file of this patent:

UNITED STATES PATENTS

| Number | Name | Date |
| --- | --- | --- |
| 1,553,462 | Newton | Sept. 15, 1925 |
| 1,813,631 | Minor | July 7, 1931 |
| 1,834,667 | Wood | Dec. 1, 1931 |
| 1,836,666 | Katzfey | Dec. 15, 1931 |
| 2,052,114 | Sanders | Aug. 25, 1936 |
| 2,187,833 | Lock et al. | Jan. 23, 1940 |
| 2,322,076 | Watson | June 15, 1943 |